No. 888,217. PATENTED MAY 19, 1908.
J. E. BISHOP.
IRRIGATING SYSTEM.
APPLICATION FILED DEC. 3, 1906.
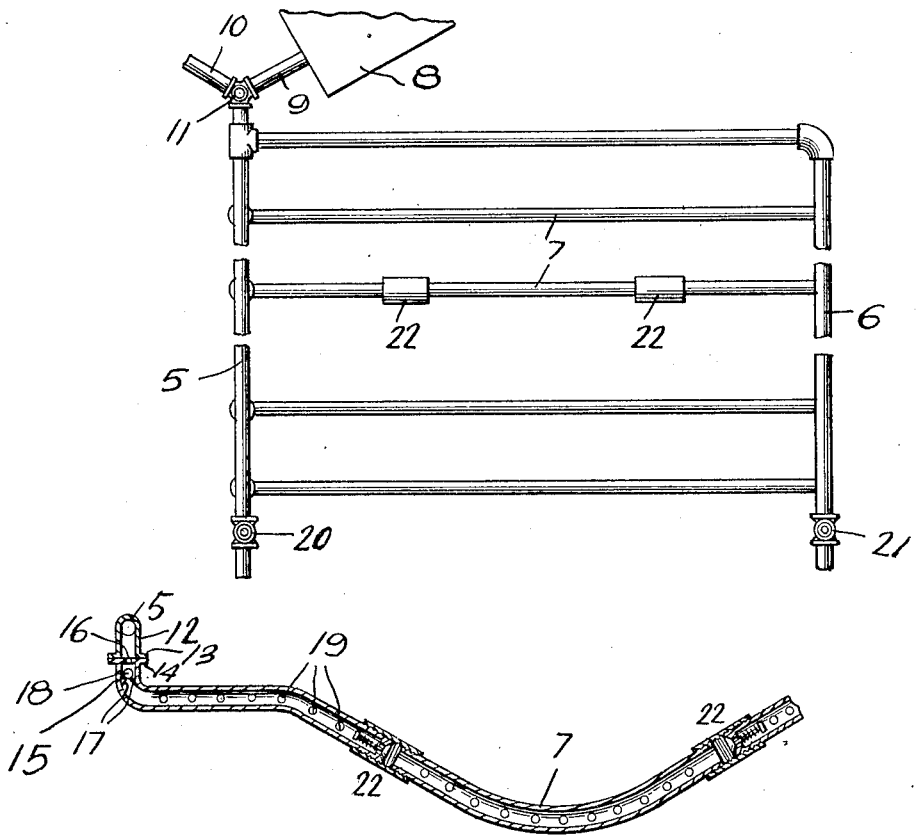
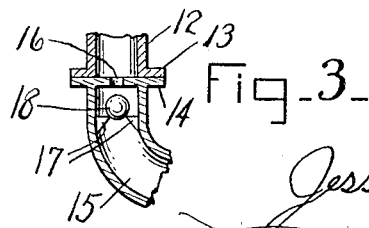

UNITED STATES PATENT OFFICE.

JESSE E. BISHOP, OF ALTON, MISSOURI.

IRRIGATING SYSTEM.

No. 888,217.  Specification of Letters Patent.  Patented May 19, 1908.

Application filed December 3, 1906. Serial No. 346,104.

*To all whom it may concern:*

Be it known that I, JESSE E. BISHOP, a citizen of the United States, residing at Alton, in the county of Oregon, State of Missouri, have invented certain new and useful Improvements in Irrigating Systems; and I do hereby declare the following to be a full, clear, and exact description of the invention, such as will enable others skilled in the art to which it appertains to make and use the same.

This invention relates to irrigating systems and has for its primary object to provide a system of this class which will be entirely automatic in its operation. That the system is automatic is due to the employment of check valves which are located in certain of the branch pipes where such pipes extend into a hollow or valley, one of the check valves being placed at the upper portion of each bend. The float valves are intended to prevent back flow of water in the branch pipes and into the main supply in case the water supply should be exhausted or fall, these valves subserving this function where the portion of the branch pipe adjacent the main supply pipe is inclined upwardly in a direction from the main supply. The function of the check valves is to prevent the flow of water to the depressed portions of the branch pipes when the pressure due to the head of water falls below a predetermined amount.

In the accompanying drawings, Figure 1 is a plan view of the system, portions being broken away, and, Fig. 2 is a detail vertical longitudinal sectional view through one of the branch pipes showing the arrangement of the float and check valves therein. Fig. 3 is a detail vertical sectional view through one of the main supply and branch pipes at their point of junction showing the construction and manner of mounting the float valves.

As shown in the drawings the system embodying my invention comprises a main supply pipe 5 and a secondary supply pipe 6 which extends substantially parallel with the main supply pipe and is connected therewith by means of branch pipes 7, these pipes being located at such distance apart that the land over which the system extends will be evenly treated and it is to be understood that any kind of pipe may be employed such for example as ordinary metal pipes, tiles, or conduits and that the pipes may be of any size desired.

The numeral 8 denotes a supply tank which is of course to be filled with water and which has communication with the main supply pipe by way of a pipe 9. A pipe 10 also communicates with the pipe 5 at the point of junction of the pipe 9 therewith and at this point there is located a three-way globe valve 11 which may be operated to admit water either from the tank 8 or a natural source of supply through the pipe 10, it being understood that the natural source may be utilized under ordinary conditions but that when the supply is exhausted temporarily either by evaporation in very hot weather or from other causes the tank 8 may be utilized.

In order that connection may be had between the main supply pipe 5 and the branch pipes 7, short branches 12 lead from the under side of the main supply pipe 5, at points where it is desirable to locate the branch pipes and each of these branches 12 is flanged as at 13 for connection with a flange 14 formed at the corresponding end of the corresponding branch pipe, this end of each branch pipe being turned upwardly as at 15. The flange 14 upon the branch pipe extends not only outwardly of the pipe but also inwardly to such an extent that an opening 16 results which opening is of less diameter than the pipe itself and formed within the pipe slightly below this opening are lugs 17 upon which rests a float valve 18. As heretofore stated the function of these float valves is to prevent back flow of water from the branch pipes into the main supply pipe in cases where the portions of the branch pipe adjacent the main supply pipe are inclined upwardly in a direction from the main supply and at such times when the head of water falls below a predetermined amount.

In the pipes 5 and 6 opposite to the tank 8 there are located valves 20 and 21 respectively which may be opened to drain the system.

As most land to be irrigated is hilly or at best uneven, I have found it expedient to employ in the branch pipes 7 which extend over such land, check valves 22. These valves are spring controlled and are positioned at the upper ends of bends in the branch pipes where such bends are necessary to lead the branch pipes across a valley or hollow and the valves are so positioned in the pipes that they are adapted to open in a direction toward each other and as a consequence, when the head of water falls below the predetermined amount the valves will automatically close and prevent the flow of water to the depressed portion or bend of the pipe. In this manner less water is fed to the low portions of the land than to the high portions which is of course desirable and necessary.

The utility of the check valves will be readily apparent if it be considered that were not these valves provided the water would flow from the main pipes 5 and 6 into the lower or depressed portions of the pipes 7 and the lower portions of the land irrigated more thoroughly than the higher portions owing to the fact that practically the full head of the water is established within the said depressed portions of the pipes. By the provision of the valves however and the springs for holding the valves normally to their seats, a predetermined head of water must be established in the portions of the branch pipes between the valves therein and the main supply pipes before the valves will open and when they do move to open position, there will still be a greater head of water within the said portions of the pipes between the valves therein and the main supply pipes than in the depressed portions of the pipes and consequently at no time will the lower portions of the land be irrigated to as great a degree as the upper portions.

What is claimed is:—

A system of the class described comprising a supply conduit, branch conduits leading from the supply conduit, a float valve located at the point of junction of each branch conduit with the supply conduit, and spring controlled check valves interposed in certain of said branch conduits, said check valves being so positioned as to prevent the flow of water to the depressed portion of said conduits when the head of water falls below a predetermined amount.

In testimony whereof, I affix my signature, in presence of two witnesses.

JESSE E. BISHOP.

Witnesses:
C. S. GOHN,
H. R. CULP.